(12) United States Patent
Holmes

(10) Patent No.: US 8,949,153 B2
(45) Date of Patent: Feb. 3, 2015

(54) ENERGY ABSORBING SHIELD AND SYSTEM FOR SMALL URBAN VEHICLES

(71) Applicant: GM Global Technology Operations LLC, Detroit, MI (US)

(72) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 13/739,309

(22) Filed: Jan. 11, 2013

(65) Prior Publication Data

US 2014/0200772 A1 Jul. 17, 2014

(51) Int. Cl.
*G06F 7/00* (2006.01)
*B60R 19/02* (2006.01)
*B60R 21/0132* (2006.01)

(52) U.S. Cl.
CPC ........... *B60R 19/023* (2013.01); *B60R 21/0132* (2013.01)
USPC ............ 705/45; 280/735; 280/736; 280/738; 280/740

(58) Field of Classification Search
CPC ................... B60R 21/0132; B60R 2021/0004; B60R 2021/0006; B60R 2021/23107; B60R 2021/23153
USPC ...................... 701/45; 280/735, 736, 738, 740
See application file for complete search history.

(56) References Cited

U.S. PATENT DOCUMENTS

| 6,183,025 | B1 * | 2/2001 | Hope et al. | 293/131 |
| 6,203,079 | B1 * | 3/2001 | Breed | 293/119 |
| 6,343,821 | B2 * | 2/2002 | Breed | 293/119 |

* cited by examiner

*Primary Examiner* — McDieunel Marc
(74) *Attorney, Agent, or Firm* — BrooksGroup

(57) ABSTRACT

One variation includes a product including actuator system including an actuator connected to a shield; a control module for selectively actuating or deploying the actuator wherein the actuator may be moved from a first position to a second position in which the shield is extended a distance away from the first position.

18 Claims, 3 Drawing Sheets

ENERGY ABSORBING SHIELD AND SYSTEM FOR SMALL URBAN VEHICLES

TECHNICAL FIELD

The field to which the disclosure generally relates to includes energy absorbing systems for vehicles.

BACKGROUND

Crashes involving vehicles may occur from time to time. When one vehicle crashes into another or into another hazard, the vehicles and their occupants may momentarily suffer high accelerations. The magnitude of such an acceleration, which may produce injury, may be lessened by transferring the momentum from the crash more gradually, requiring a greater distance to effect the transfer.

SUMMARY OF ILLUSTRATIVE VARIATIONS OF THE INVENTION

One variation may include a product including a shield, an actuator system including an actuator connected to the shield, and a control system for selectively actuating the actuator wherein the shield may be moved from a first position to a second position in which the shield is extended a distance away from the first position and the shield may be moved from the second position back to the first position. In one variation the shield may be a vehicle bumper.

In one variation the shield may be a body panel. In one variation the actuator is constructed and arranged to move the shield back and forth from the first position to the second position and from the second position to the first position.

One variation may include a method including providing a first vehicle having an actuator connected to one of a bumper or body panel, a controller operative connected to the actuator to actuate the same, and a sensor connected to the controller for sensing distance another vehicle is from the first vehicle and providing input to the controller, the controller being constructed and arranged to calculate a likelihood of a collision with another vehicle based on input from the sensor, the controller being constructed and arranged to actuate the actuator upon calculation of a high likelihood of a collision, actuating the actuator upon calculation of a high likelihood of a collision, and retracting the actuator upon calculation of a low likelihood of a collision if a collision does not occur.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
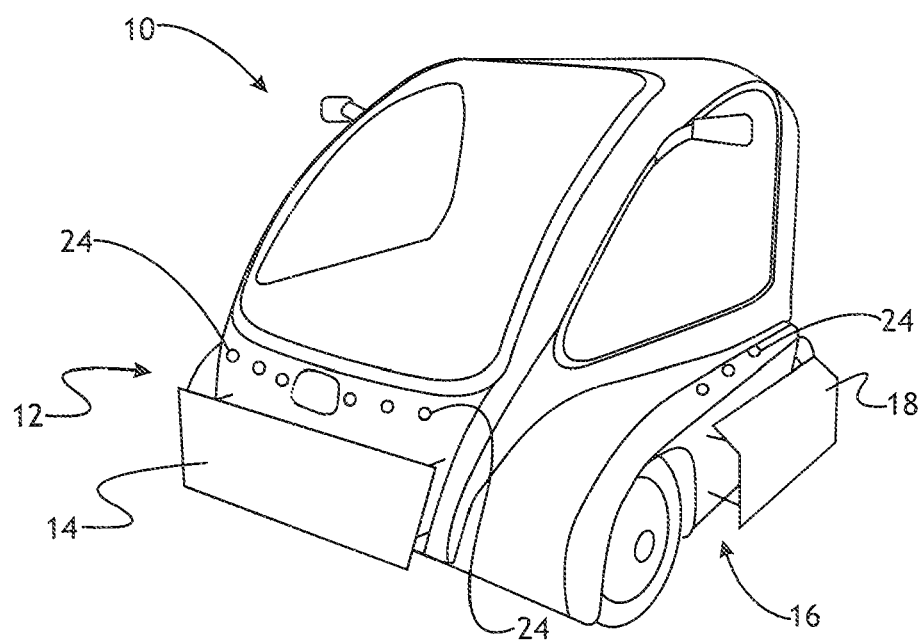
FIG. 1 is a perspective front view of a vehicle including an actuator system according to a number of variations of the invention.

FIG. 1 is a perspective front view of a vehicle 10 including an actuator system according to a number of variations of the invention. The vehicle 10 may include a front end 12 having a front bumper or front body panel 14. The vehicle may have two opposed sides 16 having a runner or side body panel 18. A plurality of Doppler sonar units or other sensors 24 may be provided along the front end 12, sides 16 and/or rear end 20 of the vehicle for use in determining the likelihood of another vehicle crashing into the vehicle 10.

Figure 2:
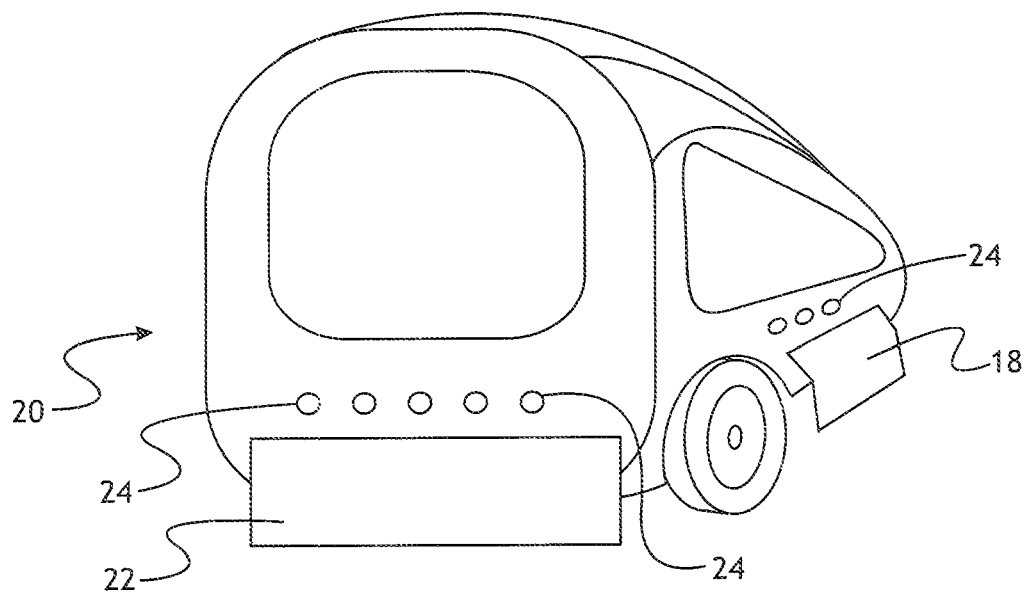
FIG. 2 is a perspective rear view of a vehicle including an actuator system according to a number of variations of the invention.

Similarly, FIG. 2 is a perspective rear view of the vehicle 10 showing a rear end 20 which may include a rear bumper or rear body panel 22. An actuator may be attached to the vehicle bumper, runner or body panel 14, 16, 18 (FIGS. 1-2).

Figure 3:
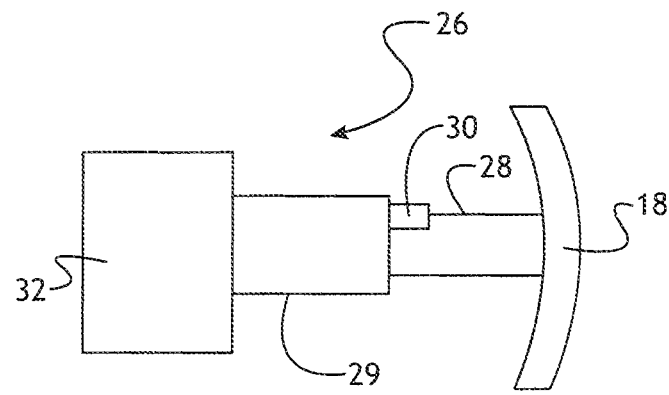
FIG. 3 is an illustration of an actuator according to one variation of the invention.

Referring now to FIG. 3, in one variation, an actuator 26 may be connected to a body panel 18 and may include a motor 20 constructed and arranged to move the body panel 18 from a first position flush with other body panels to a second position extended from the other body panels, for example, by a piston 28 received in a piston chamber 30. In one variation, an optional lock 30 may be provided to lock the piston 28 in an extended position upon deployment of the actuator. In the case where the actuator 26 is locked upon deployment, the actuator may be crushed during a collision and serves to absorb a portion of the energy of the crash. In another variation, a lock 30 is not provided and a substantial portion of the energy of a crash is absorbed by the body panel 18 or a bumper or runner attached to the actuator.

A system including an actuator connected to a body panel 18, bumper or runner is particularly advantageous for relatively small urban vehicles. For example, in one variation, an urban vehicle 2.0 meters long and 1.5 meters wide may be constructed with the passenger compartment 1.5 meters long and 1.3 meters wide and a cargo space of 0.3 meters long and 1.3 meters wide behind the passengers. Such a vehicle would then have only 100 millimeters of space around the occupants and cargo, of which 50 millimeters might be internal padding and 50 might be structure and exterior panels. The 100 millimeters may not offer the occupants the highest rating of safety, because more linear distance may be required to accelerate the vehicle and occupants at acceptable rates during a collision, especially with a fixed object or a heavy vehicle. Therefore, the 50 millimeter structural "layer" around the occupants may include deployable or retractable (that is, reusable) surfaces and structure, which may be moved outwardly immediately before a collision is expected. On the sides of the vehicle, the distance might be an additional 300 millimeters, for example, enough to soften the side impact. If a shield were activated in response to a vehicle traveling 20 meters per second (about 45 miles per hour) at a distance of 3 meters (about 10 feet), then the shield would have more than ⅛ second to extend 0.3 meters and its average speed during deployment would need to be only 2.2 meters per second (about 5 miles per hour). Both low cost and low hazards for false positives in the detection of obstacles provides a way to avoid false negatives and allows for relatively early activation of the actuator when there is still uncertainty about whether a collision would actually occur. Early activation of the actuator allows the actuator to be a minimal hazard and contributes to a low hazard factor for false positives. A deployable-and-retractable surface-structure attached to an actuator is reusable, and much less costly to activate than, for example otherwise conventional airbags, which are not reusable, applied to the outside of the vehicle.

Figure 4:
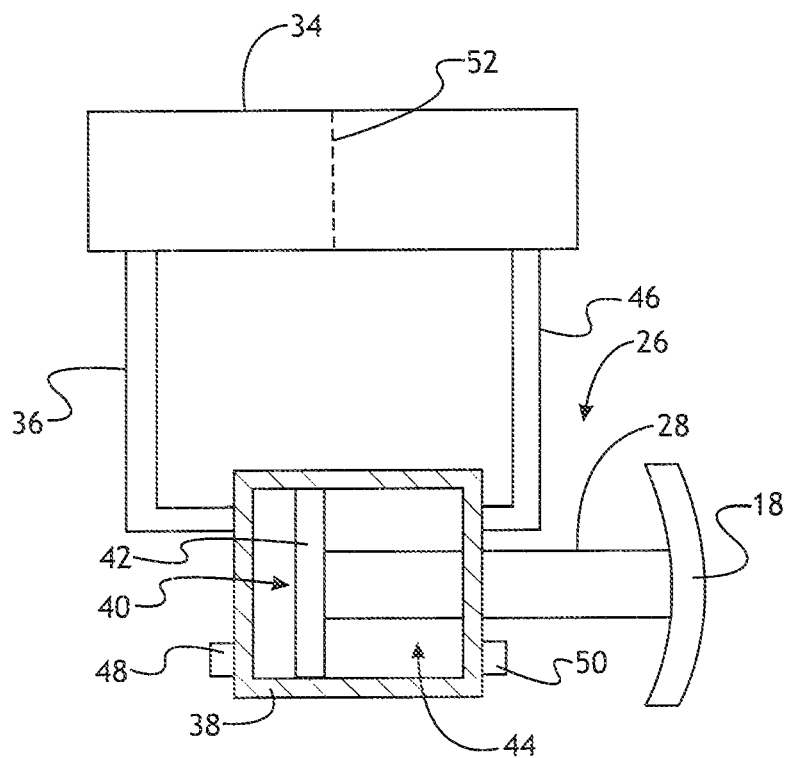
FIG. 4 is a schematic illustration of an actuator system including a gas source for advancing and retracting the actuator according to a number of variations of the invention.

FIG. 4 illustrates a number of variations of the invention including an actuator 26 which may include a piston housing 38 including a first chamber 40 for receiving gas from a gas source 34 through a first gas line 36 plumbed to the first chamber 40. The actuator 26 may be deployed by flowing gas from the gas source 34 through the first gas line 36 and into the first chamber 40 where the gas pushes against a piston push plate 42 attached to a piston 28 having a body panel 18, bumper or runner attached thereto. A second gas line 46 may be connected to the gas source 34 and to a second chamber 44 of the piston housing 38. Gas flowing through the second gas line 46 and into the second chamber 44 may push against the opposite side of the push plate 42 to retract the actuator. A first valve 48 may be connected to the first chamber to discharge gas from the first chamber during the retraction of the piston 28. A second valve 50 may be connected to the second chamber 44 to discharge gas in the second chamber 44 during activation of the actuator 26. A separator 52 may be provided in the gas source 34 if desired to provide separate sources of the gas for activating and retracting the actuator. In one variation the gas source 34 may include dry nitrogen and may be easily recharged through a refill fitting (not shown).

In another variation a gas source 34 may be include a pump. In one variation the gas source 34 may include air pumped by the air pump.

Figure 5:
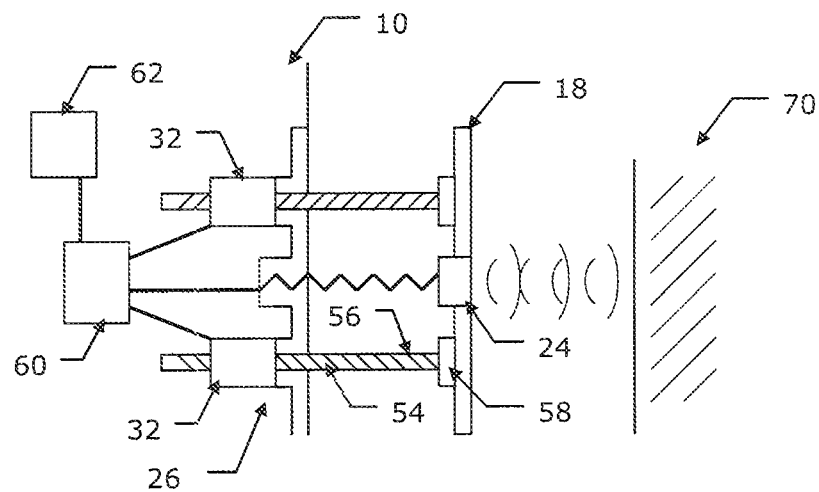
FIG. 5 illustrates an actuator including a motor which travels along a helical path according to one variation of the invention.

FIG. 5 is a schematic illustration of one variation of an actuator 26 including a motor 32 connected to a guide bar or rod 54 having a helical guide groove 56 formed therein to allow the motor 32 having a body panel 18 or bumper or runner attached thereto by a rod 58 to activate the actuator to extend the body panel 18 away from the other body panels or to retract the body panel to a position in which the body panel 18 is flush with the other body panels. In one variation, the Doppler sonar unit or other sensor 24 may be attached to the body panel 18 to prevent the panel 18 from interfering with the sensor 24 when the panel 18 is in an extended position. The sensor 24 may be used to detect another vehicle or other hazard 70, such as, a building, pole, wall or person.

Figure 6:
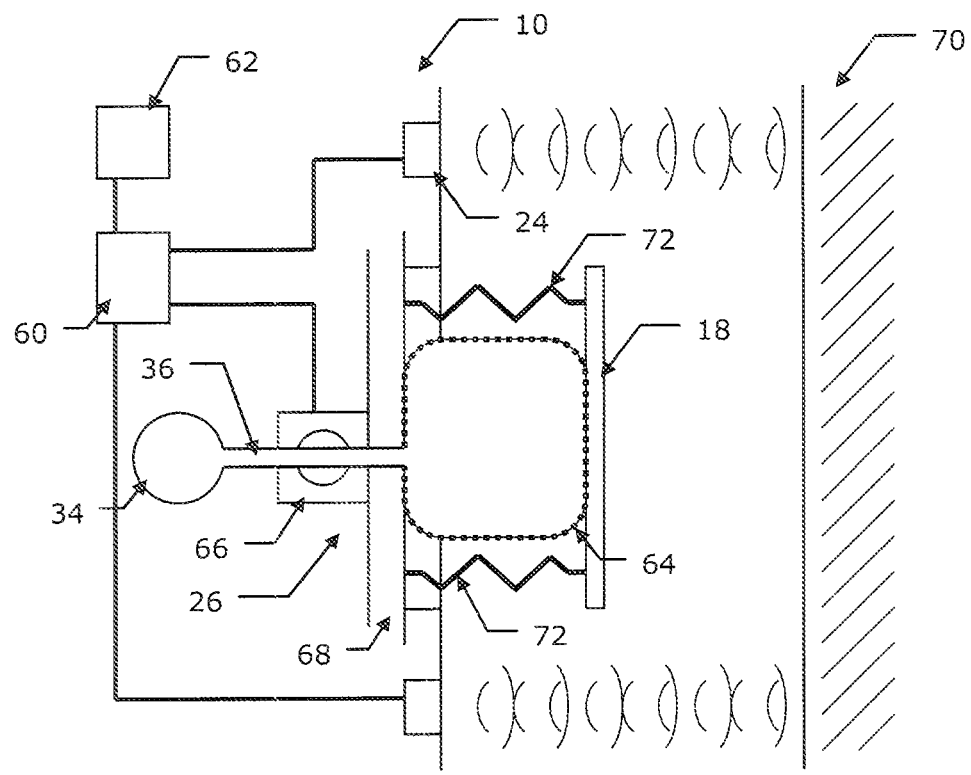
FIG. 6 is a schematic illustration of a method of controlling and using an actuator system according to a number of variations of the invention.

FIG. 6 is a schematic illustration of a system for controlling an actuator 26 according to a number of variations of the invention. A controller or an electronic control module 60 may be provided and may receive input from the Doppler sonar or other sensor 24 regarding other vehicles approaching the vehicle 10. Multiple Doppler sonar or other sensors 24 may be employed by the control module 60 for detecting an approaching hazard 70. The electronic control module 60 may include hardware or software constructed and arranged to estimate the likelihood of another vehicle crashing into the vehicle 10. The electronic control module 60 may receive other input from other sensors 62 including accelerometers and engine operating conditions which may be utilized to determine the likelihood of another vehicle crashing into the vehicle 10. The electronic control module 60 may provide outputs to the actuator 26 and receive feedback therefrom to selectively advance the actuator if a crash has been determined by the electronic control module to be likely and to retract the actuator in the event that a crash does not occur. In one variation, a gas storage tank 34 may be provided and connected to a gas delivery line 36 and constructed and arranged to flow gas into an inflatable bag 64 (e.g., an air bag) through a valve 66 that is operated by the control module 60. The inflatable bag 64 may be attached to a vehicle support structure 68 behind the panel 18. One or more retraction springs 72 may be connected between the panel 18 and the support structure 68 to return the panel 18 from an extend position (second position) back to a position wherein the panel 18 is flush with the remainder of the surface of the vehicle 10 (first position). in the process the gas in the bag 64 may be pushed out of the bag 64 through small vents or pores and the bag 64 collapsed to a reusable condition.

The controller 60 and any control subsystem may include one or more controllers (not separately shown) in communication with the actuator and sensors for receiving and processing sensor input and transmitting actuator output signals. The controller(s) may include one or more suitable processors and memory devices (not separately shown). The memory may be configured to provide storage of data and instructions that provide at least some of the functionality of the engine system and that may be executed by the processor(s). At least portions of the method may be enabled by one or more computer programs and various engine system data or instructions stored in memory as look-up tables, formulas, algorithms, maps, models, or the like. In any case, the control subsystem may control engine system parameters by receiving input signals from the sensors, executing instructions or algorithms in light of sensor input signals, and transmitting suitable output signals to the various actuators. As used herein, the term "model" may include any construct that represents something using variables, such as a look up table, map, formula, algorithm and/or the like. Models may be application specific and particular to the exact design and performance specifications of any given engine system.

In a number of variations of the invention, the actuator is constructed and arranged to deploy the vehicle body panel 18, bumper or runner to an extended position at a relatively slow rate, for example, less than 5 meters per second, less than 3 meters per second, less than 2 meters per second, or less than 1 meter per second. A low speed of deployment may be an advantage in limiting any potential hazard that might exist in the event of a false positive deployment. A low overall cost of deployment, including any potential hazard, is an advantage in allowing the deployment to be initiated relatively early, when the likelihood of a collision is less certain and therefore a false positive deployment is more likely, and therefore allowing the deployment to be relatively slow. Furthermore, a low speed of deployment may be an advantage in designing an actuator, so that pyrotechnics may not be required and the actuator may be reusable.

One variation may include a method including providing a first vehicle having an actuator connected to one or a bumper, runner or body panel, and a controller may be operative connected to the actuator to actuate the same. A sensor may be connected to the controller for sensing distance another vehicle is from the first vehicle and providing input to the controller. The controller may also receive input from other sensors such as accelerometers, steering position sensors and the like on the first vehicle to determine the speed and direction of the first vehicle and take into account the same in making a calculation regarding the likelihood of a collision occurring. The controller may be constructed and arranged to calculate a likelihood of a collision with another vehicle based on input from the sensor. The controller may be constructed and arranged to actuate the actuator upon calculation of a high likelihood of a collision. If a high likelihood of a collision has been calculated the controller may cause the actuator to active and cause the shield to be moved from a first position to a second position space a distance from the first position. The second position is such that the point of impact is further from the vehicle occupants than when the shield is in the first position thereby providing a greater safety space cushion for the occupants. The controller may use input from the sensors to determine if a collision has not occurred. If a collision has not occurred, the controller may cause the actuator to retract causing the shield to move back from the second position to the first position.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other that as expressly described herein and still are considered to be within the scope of the invention.

Variation 1 may include a product including a shield, an actuator system including an actuator connected to the shield, and a control system for selectively actuating the actuator wherein the shield may be moved from a first position to a second position in which the shield is extended a distance away from the first position and the shield may be moved from the second position back to the first position.

Variation 2 may include a product as set forth in Variation 1 wherein the shield may be a vehicle bumper.

Variation 3 may include a product as set forth in any of Variations 1-2 wherein the shield may be a body panel.

Variation 4 may include a product as set forth in any of Variation 1-3 wherein the actuator controller are constructed and arranged to move the shield back to the first position.

Variation 5 may include a product as set forth in any of Variations 1-4 wherein the actuator is constructed and arranged to deploy the shield at less than 5 meters per second.

Variation 6 may include a product as set forth in any of Variation 1-5 wherein the actuator is constructed and arranged to deploy the shield at less than 3 meters per second.

Variation 7 may include a product as set forth in any of Variations 1-6 wherein the actuator is constructed and arranged to deploy the shield at less than 2 meters per second.

Variation 8 may include a product as set forth in any of Variations 1-7 further comprising a gas source connected to the actuator to deliver a flow of gas to actuate the actuator and move the shield from the first position to the second position.

Variation 9 may include a as set forth in any of Variations 1-8 further comprising a gas source connected to the actuator to deliver a flow of gas to retract the actuator and move the shield back from the second position to the first position.

Variation 10 may include a product as set forth in any of Variations 1-9 further comprising a gas source for activating the actuator, and wherein the gas source comprises a dry gas.

Variation 11 may include a product as set forth in Variation 10 wherein the dry gas comprises dry nitrogen.

Variation 12 may include a product as set forth in any of Variations 1-11 wherein the actuator includes a piston received in a piston housing, the piston housing having a first gas chamber for receiving a flow of gas therein applying a force against the piston to move the shield from the first position to the second position.

Variation 13 may include a product as set forth in Variation 12 wherein the piston housing further includes a second gas chamber for receiving a flow of gas therein applying a force against the piston to move the shield back from the second position to the first position.

Variation 14 may include a product as set forth in any of Variations 1-13 wherein the actuator comprises a piston connected to a motor.

Variation 15 may include a product as set forth in Variations 1-14 further comprising a lock for locking the actuator in the second position.

Variation 16 may include a product as set forth in any of Variations 1-15 further comprising a guide bar or rod having a helical groove formed therein and wherein the motor rides on the bar or rod to move the actuator from the first position to the second position, and from the second position to the first position.

Variation 17 may include a product as set forth in any of Variations 1-16 wherein the shield is a first body panel, the product including other body panels, and wherein the first body panel is flush with the other body panel in the first position and wherein the first body panel is spaced a distance from the other body panels in the second position.

Variation 18 may include a method comprising providing a first vehicle having an actuator connected to one or a bumper, runner or body panel, and a controller operative connected to the actuator to actuate the same, a sensor connected to the controller for sensing distance another vehicle is from the first vehicle and providing input to the controller, the controller being constructed and arranged to calculate a likelihood of a collision with another vehicle based on input from the sensor, the controller being constructed and arranged to actuate the actuator upon calculation of a high likelihood of a collision, actuating the actuator upon calculation of a high likelihood of a collision, and retracting the actuator if a collision does not occur.

Variation 19 may include a method as set forth in Variation 18 carried out using a production as set forth in any of Variations 1-17.

The above description of select examples of embodiments of the invention is merely exemplary in nature and, thus, variations or variants thereof are not to be regarded as a departure from the spirit and scope of the invention.

What is claimed is:

1. A product comprising a shield, an actuator system including an actuator connected to the shield; a control system for selectively actuating or deploying the actuator wherein the shield may be moved from a first position to a second position in which the shield is extended a distance away from the first position and the shield may be moved from the second position to the first position, wherein the control system comprises a controller or electronic control module constructed and arranged to provide an output signal to the actuator.

2. A product as set forth in claim 1 wherein the shield may be a vehicle bumper.

3. A product as set forth in claim 1 wherein the shield may be a body panel.

4. A product as set forth in claim 1 wherein the actuator controller are constructed and arranged to move the shield back to the first position.

5. A product as set forth in claim 1 wherein the actuator is constructed and arranged to deploy the shield at less than 5 meters per second.

6. A product as set forth in claim 1 wherein the actuator is constructed and arranged to deploy the shield at less than 3 meters per second.

7. A product as set forth in claim 1 wherein the actuator is constructed and arranged to deploy the shield at less than 2 meters per second.

8. A product comprising a shield, an actuator system including an actuator connected to the shield; a control system for selectively actuating or deploying the actuator wherein the shield may be moved from a first position to a second position in which the shield is extended a distance away from the first position and the shield may be moved from the second position to the first position, and further comprising a gas source connected to the actuator to deliver a flow of gas to actuate the actuator and move the shield from the first position to the second position.

9. A product as set forth in claim 8 further comprising a gas source connected to the actuator to deliver a flow of gas to retract the actuator and move the shield back from the second position to the first position.

10. A product as set forth in claim 8 further comprising a gas source for activating the actuator, and wherein the gas source comprises a dry gas.

11. A product as set forth in claim 10 wherein the dry gas comprises dry nitrogen.

12. A product comprising a shield, an actuator system including an actuator connected to the shield; a control system for selectively actuating or deploying the actuator wherein the shield may be moved from a first position to a second position in which the shield is extended a distance away from the first position and the shield may be moved from the second position to the first position, and wherein the actuator includes a piston received in a piston housing, the piston housing having a first gas chamber for receiving a flow of gas therein applying a force against the piston to move the shield from the first position to the second position.

13. A product as set forth in claim 12 wherein the piston housing further includes a second gas chamber for receiving a flow of gas therein applying a force against the piston to move the shield back from the second position to the first position.

14. A product as set forth in claim 1 wherein the actuator comprises a piston connected to a motor.

15. A product as set forth in claim 14 further comprising a lock for locking the actuator in the second position.

16. A product as set forth in claim 14 further comprising a guide bar or rod having a helical groove formed therein and wherein the motor rides on the bar or rod to move the actuator from the first position to the second position, and from the second position to the first position.

17. A product as set forth in claim 1 wherein the shield is a first body panel, the product including other body panels, and wherein the first body panel is flush with the other body panel in the first position and wherein the first body panel is spaced a distance from the other body panels in the second position.

18. A method comprising providing a first vehicle having an actuator connected to one or a bumper, runner or body panel, and a controller operative connected to the actuator to actuate the same, a sensor connected to the controller for sensing distance another vehicle is from the first vehicle and providing input to the controller, the controller being constructed and arranged to calculate a likelihood of a collision with another vehicle based on input from the sensor, the controller being constructed and arranged to actuate the actuator upon calculation of a high likelihood of a collision, actuating the actuator upon calculation of a high likelihood of a collision, and retracting the actuator if a collision does not occur.

* * * * *